April 26, 1960     N. KLOMPAS     2,934,168

LUBRICATING AND SCAVENGE SYSTEM FOR BEARING ASSEMBLY

Filed May 26, 1958

INVENTOR
NICHOLAS KLOMPAS

BY: *Maybee & Legris*
ATTORNEYS

United States Patent Office 2,934,168
Patented Apr. 26, 1960

2,934,168

LUBRICATING AND SCAVENGE SYSTEM FOR BEARING ASSEMBLY

Nicholas Klompas, Beverley Hills, Ontario, Canada, assignor to Orenda Engines Limited, Malton, Ontario, Canada, a corporation Application May 26, 1958, Serial No. 737,835

6 Claims. (Cl. 184—6)

This invention relates to systems for lubricating and scavenging bearing assemblies and in particular to such systems for use in gas turbine aircraft engines.

In gas turbine engines, shafts are frequently supported for extremely rapid rotation in bearings located quite near areas of high temperature within the engine. In such cases, for example, the rear bearing of the main shaft of an axial flow gas turbine engine, it is necessary to provide an adequate flow of oil to the bearings for both lubricating and cooling purposes and it is equally necessary to scavenge the bearing to remove excess oil from the bearing surfaces to enable the bearing to run as freely as possible.

To assist in keeping the bearing cool, to assist in the scavenging of the oil from the bearing and to provide an air seal for the oil in the bearing area, a flow of air is passed into the bearing area in a direction opposite to that in which the oil normally might flow.

It is an object of the present invention to provide structure which will enable the air flow to most efficiently scavenge the bearing and its associated oil sump and which will provide for adequate lubrication of the bearings and for return of the scavenged oil to the main sump without permitting it to accumulate above a predetermined level in the bearing sump. This latter is particularly important when it is realized that an aircraft engine is constantly changing its attitude relative to the ground and, as a result, in some engine attitudes the bearings could be flooded if excess oil were allowed to accumulate in the bearing sump.

Figure 1:
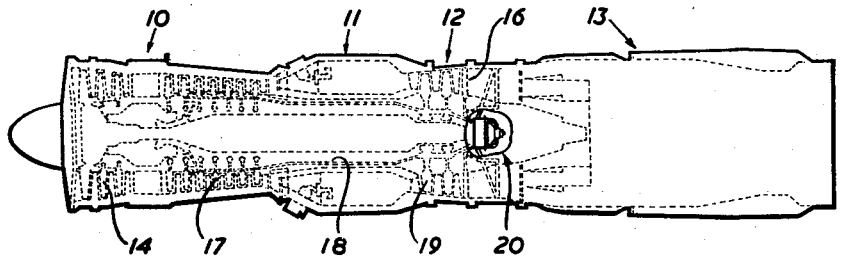
Figure 2:
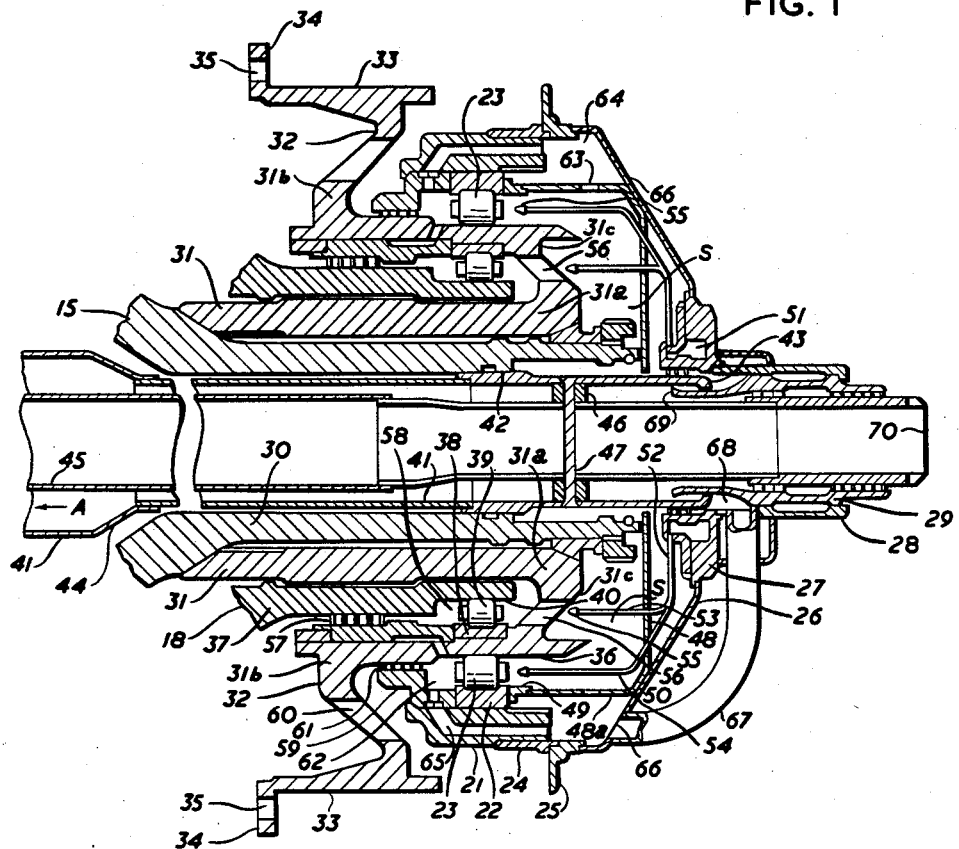

A preferred embodiment of the invention will be described in detail in the following specification and illustrated in the accompanying drawings in which:

Figure 1 is a side elevation of an axial flow gas turbine engine with a portion broken away to show the general location of the invention, and, Figure 2 is a sectional view of the rear bearing of a gas turbine engine embodying the present invention.

Referring now to Figure 1 it will be seen that the gas turbine engine comprises generally a compressor section 10, a combustion section 11, a turbine section 12 and a tailpipe section 13.

From Figure 1 it may be seen that the compressor section of the engine comprises a first low pressure compressor 14 which is journalled on an inner, hollow rotatable shaft 15 which, at its after end, supports a low pressure turbine 16. The high pressure compressor 17 is mounted for rotation on an outer hollow shaft 18 which, at its after end, supports for rotation the high pressure turbine 19. The bearing to which the present lubricating and scavenging system relates may, in the embodiment illustrated, be the rear bearing for the shafts 15 and 18 and is indicated generally in Figure 1 by reference numeral 20.

Referring now to Figure 2 the rear bearing assembly may be seen in detail.

The bearing assembly generally is supported in stator structure which comprises the annular ring 21, on the inner surface of which is carried the outer race 22 for the first bearing 23. The annular ring 22 supports, at its after end, a second annular ring 24 secured to its outer surface, which ring 24, in turn, carries a radially extending flange 25 to which is secured a dished sheet metal housing 26 which constitutes one wall of an annular oil sump S. The dished sheet metal housing 26, remote from its point of attachment to flange 25, carries an annular member 27 of much smaller diameter than flange 25 to which is secured an axially extending sleeve 28 which, in turn, carries a further sleeve 29 mounted within it.

All of the structure so far recited, with the exception of bearing 23, is stationary and is rigidly secured to the frame of the gas turbine engine by conventional means which are not shown in Figure 2.

Referring to Figure 2 the inner rotating shaft 15 which carries the low pressure compressor and the low pressure turbine may be seen, in Figure 2, to terminate, at its after end, in a sleeve 30 which carries, surrounding it, a retroverted sleeve 31 constituted by an inner sleeve 31a which is integrally secured to an outer sleeve 31b by means of a joining web 31c. The forward end of the outer sleeve 31b carries a substantially radially extending web 32 to which, at its outer end, is secured a substantially axially extending flange 33 which, in turn, is provided at its forward end with a radially extending flange 34 provided with bolt holes 35 to which may be secured the low pressure turbine drum.

The bearing 23 supports this rotating assembly, the external surface 36 of outer sleeve 31b constituting the inner race for bearing 23 which may be seen, from Figure 2, to run between outer race 22 and surface 36 of outer sleeve 31b. Since outer race 22 is secured to stator structure, the hollow shaft 15, through the medium of the associated parts described above, will be journalled for rotation about the axis of annular bearing race 22.

Outer shaft 18 (see Figure 1) is journalled for rotation relative to the inner shaft 15 by means of a substantially cylindrical sleeve which constitutes the after end of the outer shaft 18. This substantially cylindrical sleeve 37 extends into the annular space between outer sleeve 31b and inner sleeve 31a, just described, and is supported in rotational relationship thereto by means of outer bearing race 38, bearing 39, the inner bearing race for the system being constituted by the outer surface 40 of the sleeve 37. From the above description it will be seen that the two shafts 15 and 18 are supported for rotation relative to the stator structure and relative to each other by the bearing system just described.

Lying internally of the inner shaft 15 is a further hollow shaft 41 which is secured to the inner surface of sleeve 30 at point 42 by any suitable means such as welding, brazing or splining. This shaft 41 is substantially cylindrical along that portion of its length which lies generally within the bearing assembly illustrated in Figure 2 and is provided, at its after end, with a shallow radially inwardly extending flange 43 for a purpose which will later be described. Forwardly of the bearing assembly illustrated in Figure 2, however, the diameter of shaft 41 increases at a frusto-conical section 44 as seen in Figure 2. The position of this increase in diameter in shaft 41 is not critical although it may conveniently occur at substantially the same point at which the increase in diameter in shaft 15 takes place, as may be seen in Figure 2. A further hollow shaft 45 lies concentrically within the shaft 41 and is secured thereto in spaced relationship by means of spacing blocks 46 and a pin 47 in the manner shown in Figure 2. This hollow shaft 45 extends, in a rearward direction, beyond the end of shaft 41 and is open, at its after end, for purposes which will be later described.

The dished sheet metal housing 26 which was described as constituting one wall of the oil sump associated with the bearing assembly carries, within it and secured thereto, a further dished sheet metal structure 48, the free edges of which are in contact with the after edges of an annular ring 49 adjacent the outer bearing race 22, the member 48 being also secured to the inner surface of the dished member 26 at 50 by suitable means such as riveting, bolting or brazing. The structure 48 constitutes a baffle within the oil sump, the bounds of which may now be defined as the dished sheet metal member 26, the inner surface of flange 25, the inner surfaces of annular ring 22, the after side of bearings 23, the after side of web 31c and the external surface of shaft 41 and the forward surface of the annular member 27.

The annular member 27 is provided with an internal gallery 51 to which oil is delivered under pressure through conduit means which are not shown. The bearings may be lubricated by a plurality of feed lines 52 extending from the gallery 51 and which divide into branches 53 and 54 and which terminate, at their ends, in nozzles 55 which are directed so as to deliver oil, in spray form, and under high pressure onto the bearings 23 and 39. Bearing 23 is open to the interior of the sump S and access to bearing 39 which is otherwise masked by web 31c is provided by means of a series of apertures 56 in web 31c through which oil may be directed as web 31c rotates. Other conventional methods of supplying oil to the bearings may be employed.

As is common in bearing structures of this type it is desirable that the interior of the sump S be pressurized to scavenge the oil therefrom and to prevent vaporization of the oil under the atmospheric conditions found at high altitudes.

The environment of the rear bearing assembly will be one of pressure above atmospheric pressure and a number of passages are provided to the sump through which this pressure may be transmitted thereto. One of these passages is through the labyrinth seal 57 between the internal surface of sleeve 31b and the external surface of sleeve 37. The labyrinth seal 57 provided in this passage will result in a pressure drop across the seal and, accordingly, a certain flow of air will cross the seal. This flow of air will act as an oil seal for the sump since oil will be prevented from flowing through the seal in a direction opposite to that of the air flow. A further labyrinth seal 61 is provided in the passage between the external surface of sleeve 31b and the internal surface of an annular member 59 secured to the annular member 21. Here again a pressure drop will be experienced across the seal and an oil seal will be provided by the air flow across the labyrinth seal.

Accordingly, oil directed upon the bearings 23 and 39 will, due to the centrifugal force imparted to it by the rotation of the parts in the bearing assembly be flung outwardly onto the inner surface of the baffle 48a. Holes 63 are provided at spaced points along the periphery of the cylindrical wall 48a of the baffle 48 to permit this oil to drain into the annular space 64 defined between the dished sheet metal member 26 and the external surface of the cylindrical wall 48a.

In order to vent the annular sump S and to scavenge the oil from it, as is necessary, an opening 66 is provided in the dished sheet metal member 26 adjacent the periphery of the sump S and remote from the bearing and in this opening is fitted a scavenge duct 67 as may be seen in Figure 2.

This scavenge duct 67 extends rearwardly and radially inwardly from the opening 66 and passes through an opening provided for it in sleeve 28 which, as has been described above, extends rearwardly and axially of the annular member 27. The scavenge duct 67, at its radially inner end, has access to an annular space 68 which surrounds the external surface of the forward end of sleeve 29. Sleeve 29 extends forwardly through the open end of hollow shaft 41 and its external surface is spaced from the radially inner end of the inturned flange 43 on the end of shaft 41. Thus, a passage is provided from the interior of the duct 67 to the annular space 68 and thence into the interior of the hollow rotating tube 41.

During operation of the engine with which this bearing is associated, it will be appreciated that, with the exception of baffle 48 and the dished sheet metal member 26 and its supporting structure, which constitute the rearward wall of the sump, every other member constituting a wall of the sump is in rapid rotation. As a result there is little likelihood of any pools of liquid oil collecting within the sump, the oil rather constituting an air-oil froth which will be violently agitated due to the rotation of the members constituting the forward wall of the sump. As a result, the pressurizing air which enters the sump and which leaves it through the scavenge duct 67, will carry with it the scavenged oil in the form of an air-oil mist or froth. This air-oil mist or froth is passed through the scavenge duct against the external surface of the forward end of sleeve 29 and, under the influence of the outwardly flared forward end 69 will be directed against the rapidly rotating inner surface of shaft 41. Once this happens the air-oil froth will be immediately subjected to centrifugal force which will tend to fling the oil particles against the surface of the shaft 41 and hold them there and, as a result, will separate the oil from the air to a certain extent. As the air-oil mist continues to enter the interior of hollow shaft 41, the thickness of the oil on the internal surface of the shaft 41 will increase and under the influence of centrifugal force will tend to spread out to maintain as thin a film as possible. Since the inwardly directed radial flange 43 prevents the spreading of the oil in the rearward direction, the oil will spread along the internal surface of shaft 41 in a forward direction until it encounters the frusto-conical section 44 in shaft 41 where the shaft 41 increases in diameter. At this point the centrifugal force to which the oil is subjected will cause it to move rapidly along this transitional portion in a forward direction and, as a result, the rapidly rotating shaft 41 will act as an oil pump to move the oil in the direction of the arrow A towards the forward portion of the engine.

At the forward portion of the engine there is the main engine oil sump (which forms no part of this invention) where the oil will be subjected to a further air-oil separation operation, the air which is removed from the oil being passed into the interior of hollow shaft 45 and then directed rearwardly to vent at the open end 70 of shaft 45.

In bearing structures of the type described wherein the relative rotation between the adjacent structures are very rapid, it is essential that the bearings run freely. It is essential that they be provided with an adequate supply of oil for lubrication purposes, but it is equally essential that this oil be drained from the bearings quickly for the purposes of removing heat from the bearings. If the bearing 23, for example, were forced to run in a bath of liquid oil the bearing would very rapidly overheat and, in addition, the frictional drag imposed upon the bearing due to its running through a bath of liquid oil would seriously reduce the efficiency of the machine. For this purpose it is essential that the scavenge duct 67 be positioned in such a manner that the oil will be drained away from the bearing before it reaches a level which would cause bearing flooding. In addition, in installations such as aircraft engines it is essential that the scavenge opening 66 be so positioned that changes in engine attitude will not prevent the efficient scavenging of the bearing and cause flooding under normal attitude conditions. It will be seen that, in Figure 2, the bearing is illustrated as lying in its normal attitude wherein the axis of the bearing is horizontal. In such a condition the scavenge opening 66 is below and aft of the bearings 23 and 39 and, as a result, the maximum oil level which can be achieved by the oil in the sump will be the upper edge of the scavenge opening 66. It will be seen from Figure 2 that this level is well below the level of the outer race 22 of the bearing 23.

In the event that the aircraft is in a steep climb, the maximum oil level which can be reached will, once again, be the level of the upper edge of the scavenge opening 66 when viewed in Figure 2. Assuming that the axis of the bearing assembly in Figure 2 is vertical, the oil level may still not reach the bearings 23 and 39. In the event that the aircraft is in a very steep dive in which case, the scavenge openings 66 would not serve the purpose described, it will be appreciated that the oil will then tend to lie on what constitutes, in Figure 2, the forward wall of the bearing sump. Since this entire forward wall is in very rapid rotation, it will be impossible for oil to lie on these surfaces for long enough to cause bearing flooding. The oil will be flung away from the bearing surfaces due to the rapid rotation and bearing flooding will not occur.

In the event that the aircraft is flying in inverted flight or in any other attitude about a horizontal axis, the scavenge opening 66 will not be in a position to be immersed in a bath of liquid oil which might collect in the annular space 64. Since inverted flight and other attitudes about the horizontal axis which would raise the level of opening 66 above the level of any liquid oil which had accumulated in the bottom of the annular space 64 are of relatively short duration it is not considered important to guard against this accumulation of liquid oil in these attitudes. It will be appreciated that the agitation of the oil in the bearing assembly is so violent that the presence of any appreciable amounts of liquid oil is extremely unlikely. Further, since liquid oil in the sump can only be removed in the event that its level is at least equal to the height of the upper edge of opening 66 and then only by the presence of a pressure head in the sump, other openings 66 are not provided to receive this oil since they would reduce the presure head available to remove any liquid oil which might so accumulate. Accordingly, an opening 66 is provided at the point on the periphery of the bearing assembly which is most likely to accumulate liquid oil on the rare occasions when this might occur.

In the foregoing description it is believed that a bearing lubricating and scavenging system has been described which will enable the air flow to efficiently scavenge the bearing and its associated oil pump and which will provide for adequate lubrication of the bearings and return of the scavenged oil to the main sump without permitting it to accumulate above a predetermined level in the sump. Bearing flooding is prevented in all engine attitudes of long duration and overheating and excessive frictional loading of the bearing assembly is effectively prevented.

It is obvious that certain modifications may be made in the specific structure illustrated without departing from the spirit of the invention and it is intended that the embodiment illustrated be construed as an example rather than limiting the invention which is defined in the appended claims.

What I claim as my invention is:

1. A system for lubricating and scavenging a bearing assembly including at least a stationary member, a rotatable member and a bearing between the two members to journal the rotatable member about a normally horizontal axis; comprising a source of pressurized air on one side of the bearing to deliver a flow of air through the bearing into an annular oil sump on the other side of the bearing, a jet to deliver oil in spray form onto the bearing, a scavenge port in the sump adjacent its periphery and remote from the bearing a duct leading from the scavenge port to the interior of a hollow rotatable shaft through the end of the shaft, the shaft increasing in inside diameter along its length and being of smallest diameter at that end through which the duct enters.

2. A system for lubricating and scavenging a bearing assembly including at least a stationary member, a rotatable member and a bearing between the two members to journal the rotatable member about a normally horizontal axis; comprising a source of pressurized air on one side of the bearing to deliver a flow of air through the bearing into an annular oil sump on the other side of the bearing, a jet to deliver oil in spray form onto the bearing in a direction opposite to the flow of air, a scavenge port in the sump adjacent its periphery and remote from the bearing a duct leading from the scavenge port to the interior of a hollow rotatable shaft through the end of the shaft, the shaft increasing in inside diameter along its length and being of smallest diameter at that end through which the duct enters.

3. A system for lubricating and scavenging a bearing assembly including at least a stationary member, a rotatable member and a bearing between the two members to journal the rotatable member about a normally horizontal axis; comprising a source of pressurized air on one side of the bearing to deliver a flow of air through the bearing into an annular oil sump on the other side of the bearing, a plurality of jets to deliver oil in spray form onto the bearing in a direction opposite to the flow of air, a scavenge port in the sump adjacent its periphery and remote from the bearing a duct leading from the scavenge port to the interior of a hollow rotatable shaft through the end of the shaft, the shaft increasing in inside diameter along its length and being of smallest diameter at that end through which the duct enters and being provided at that end with a radially inwardly extending flange to define an end wall partially closing the end of the shaft.

4. A system as claimed in claim 3 in which the hollow rotatable shaft increases in inside diameter along its length by at least one frusto-conical section intermediate the ends of the shaft.

5. A system as claimed in claim 1 in which the stationary member is the outer member and constitutes the defining wall for the oil sump and the rotatable member is journalled for rotation within the outer stationary member.

6. A system in a gas turbine engine for lubricating and scavenging a bearing assembly including an outer stationary frame member and at least one inner rotatable shaft member, a bearing between the two members to journal the rotatable shaft member about a normally horizontal axis; comprising a source of pressurized air on one side of the bearing to deliver a flow of air through the bearing into an annular oil sump on the other side of the bearing defined by the outer stationary member, a plurality of jets to deliver oil in spray form onto the bearing, a scavenge port in the sump adjacent its periphery and remote from the bearing a duct leading from the scavenge port to the interior of a hollow rotatable shaft through the end of the shaft, the shaft increasing in inside diameter along its length by means of a frusto-conical section intermediate its ends, and being of smallest diameter at that end through which the duct enters and provided at that end with a radially inwardly extending flange partially closing the end of the hollow shaft.

References Cited in the file of this patent

UNITED STATES PATENTS

| | | |
|---|---|---|
| 2,457,999 | Hulbert | Jan. 4, 1949 |
| 2,531,411 | Davenport | Nov. 28, 1950 |
| 2,551,660 | Feilden | May 8, 1951 |
| 2,681,837 | Boyd et al. | June 22, 1954 |
| 2,712,967 | Sutton | July 12, 1955 |